United States Patent [19]

Minamida et al.

[11] Patent Number: 4,466,499

[45] Date of Patent: Aug. 21, 1984

[54] COMBINATORIAL COUNTING METHOD

[75] Inventors: Kazukiyo Minamida, Shiga; Kouichi Ohta, Chiba, both of Japan

[73] Assignee: Kabushiki Kaisha Ishida Koki Seisakusho, Kyoto, Japan

[21] Appl. No.: 419,924

[22] Filed: Sep. 20, 1982

[30] Foreign Application Priority Data

Sep. 22, 1981 [JP] Japan ................... 56-149754

[51] Int. Cl.³ .............. G01G 9/00; G01G 19/22; G01G 19/00
[52] U.S. Cl. ........................ 177/1; 177/25; 364/567
[58] Field of Search .......... 177/1, 25, 50; 209/592; 364/567

[56] References Cited

U.S. PATENT DOCUMENTS 3,862,666  1/1975  Muskat et al. ............... 177/50
4,157,738  6/1979  Nishiguichi et al. ......... 177/1
4,360,070  11/1982 Hirano ...................... 177/25

FOREIGN PATENT DOCUMENTS 0142419  11/1981  Japan ........................ 177/1

Primary Examiner—Reinhard J. Eisenzopf
Assistant Examiner—Patrick W. Foster

[57] ABSTRACT

A combinatorial counting method for weighing a multiplicity of articles by one or a plurality of weighing machines, dividing the resulting plurality of weights by a unit weight to convert the weights into respective numbers, finding combinations of these numbers to compute combined numbers, finding the single combination of which the combined numbers are equal or closest to a set number and of which the combined weight is equal or closest to a set weight, and renewing the set weight every counting operation or whenever predetermined conditions are satisfied to use said set weight when the next counting operation is performed.

10 Claims, 13 Drawing Figures ns, respectively;

COMBINATORIAL COUNTING METHOD

BACKGROUND OF THE INVENTION

This invention relates to a combinatorial counting method for use in a case where the individual or unit weight of an article varies slightly from one article to the next, as in the case of nuts and bolts and small packaging cups for milk or other liquids, especially where the individual weight of supplied articles varies gradually with time. More particularly, the invention relates to combinatorial counting method wherein it is possible to lengthen the time period during which the total weight of articles discharged from a weighing system is substantially constant.

A combinatorial counting apparatus operates by weighing articles through use of a plurality of weighing machines supplied with the articles, converting the weight value measured by each weighing machine into the number of articles supplied to that machine, and computing combinations of the article numbers provided by each weighing machine to obtain a set number of the articles. In the combinatorial counting apparatus of the type described, the weight-to-number conversion is performed by dividing the weight measured by each weighing machine by the individual weight (namely the weight per article, referred to as the "unit" weight hereafter of the articles contained in that weighing machine. When an error develops in the unit weight of the article, however, the number of articles computed to be contained in each weighing machine is subjected to an error, with the result that the combined number of articles computed by combinatorially adding the articles in each of the weighing machines is also subjected to an error. The articles therefore cannot be counted accurately. Another problem is that the greater the number of articles to be counted by a single weighing machine, the greater will be the error in the computed number of articles. In order to accurately compute the number of a multiplicity of articles, therefore, it is required to first obtain a correct measure of the unit weight of each article. While this may be acceptable where the unit weights are constant, however, in actual practice the units weights are not constant because some articles are inevitably lighter or heavier than others. In such case it is essentially meaningless to find unit weights even if each article is weighed correctly. It is better practice to weigh a multiplicity of articles and divide their total weight by the number of the articles to determine the average unit weight. The more articles to be weighed, the more correctly the average unit weight can be obtained.

The present applicant has previously proposed, in Japanese Patent Application No. 55-133908, a counting method which includes the steps of weighing a multiplicity of articles with n-number of weighing machines, dividing the total weight measured by each weighing machine by the unit weight of the article to find the number of articles contained in each of the weighing machines, computing various combinations of numbers of articles to determine the number of articles thus combined, and finding one of the combinations having the number of articles equal or closest to a preset number. Subsequent steps include computing a new unit weight based on the total weight of articles contained in any single weighing machine or plurality thereof and the total number of articles contained in said single or plurality of weighing machines, relying upon the new unit weight in the next counting operation for computing the number of articles.

Although the foregoing method of counting articles is successful in diminishing counting errors, a problem remains in a case where the unit weight of the articles fed into the weighing machines varies with time, for this will cause the total weight of the articles discharged from the weighing machines to vary with time as well, so that the total weight of discharged articles will not be constant. By way of example, let us assume that the unit weight of the articles fed into the weighing machines increases with time. In such case, the total weight of the discharged articles will vary as indicated by the marks (O) in FIG. 1. This curve clearly shows the disadvantage encountered in the method previously proposed, namely that there is a shortening of the time interval during which the total weight of the discharged articles is constant.

SUMMARY OF THE INVENTION

Accordingly, an object of the present invention is to provide an combinatorial counting method which makes it possible to lengthen the interval of time during which the total weight of articles discharged from the weighing machines is substantially constant, even when the unit weight of the articles fed into the weighing machines varies with time.

Another object of the present invention is to provide a combinatorial counting method wherein the quantity of articles discharged from the weighing machines is that equal or closest to a set number, and the total weight of the discharge articles is substantially constant.

Other features and advantages of the invention will be apparent from the following description taken in connection with the accompanying drawings, in which like reference characters designate similar or corresponding parts throughout the several views thereof.

BRIEF DESCRIPTION OF THE DRAWINGS

FIGS. 3 through 13 are views illustrating embodiments of the present invention, in which:

FIGS. 3 and 4 show a block diagram and flowchart, respectively, for describing a first embodiment wherein a set weight is renewed for each counting operation;

FIGS. 5, 6 and 7 show an overall block diagram, a block diagram of a arithmetic control unit and a flowchart, respectively, for describing a second embodiment wherein a set weight is renewed every predetermined number of counting operations;

FIGS. 8, 9 and 10 show an overall block diagram, a block diagram of an arithmetic control unit and a flowchart, respectively, for describing a third embodiment wherein a set weight is renewed when a total weight is within preset limits; and FIGS. 11, 12 and 13 show an overall block diagram, a block diagram of a arithmetic control unit and a flowchart, respectively, for describing a fourth embodiment wherein a set weight is renewed when the total weight of articles is within preset limits every predetermined number of combinatorial counting operations.

DESCRIPTION OF THE PREFERRED EMBODIMENTS

Figure 2:
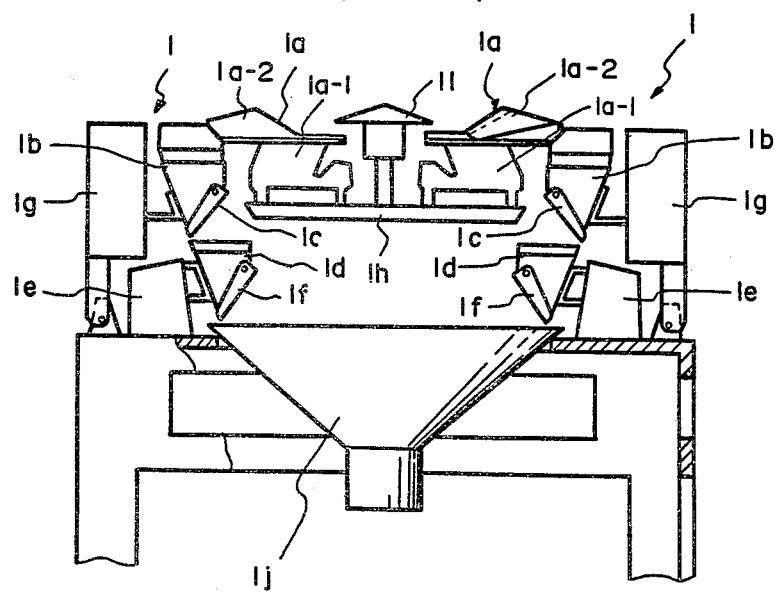
FIG. 2 is a side elevation illustrating the general structure of a combinatorial counting apparatus to which the present invention may be applied.

Referring to FIG. 2 which shows the general construction of a combinatorial counting apparatus, there is providing a dispersing table 11 of the vibratory conveyance type for vibratably dispersing articles radially outwardly when the dispersing table 11 is vibrated for a predetermined interval of time. The articles thus radially outwardly dispersed supplied into n-number of radially arranged weighing stations 1, 1, . . . disposed around the dispersing table 11. Each weighing station 1 includes a dispersing feeder 1a, a pool hopper 1b, a pool hopper gate 1c, a weighing hopper 1d, a weight sensor 1, a weighing hopper gate 1f, and a hopper driver unit 1g. Each dispersing feeder 1a is composed of an electromagnetic vibrator 1a-1 and a trough 1a-2 arranged radially on a support base 1h so as to surround the dispersing table when a multiplicity of the dispersing feeders 1a are provided. Articles fed into the trough 1a-2 from the dispersing table 11 are subjected to rectilinear reciprocating motion by the electromagnetic vibrator 1a-1, whereby the articles fall into the respective pool hopper 1b from the distal end of the trough.

The pool hopper gate 1c is provided on each pool hopper 1b in such a manner that the articles received in the pool hopper 1b are released into the weighing hopper 1d when the pool hopper gate 1c is opened under the control of the corresponding hopper driver unit 1g. Each weight sensor 1e, accompanying a respective one of the weighing hoppers 1d, is operable to measure the weight of the articles introduced into the corresponding weighing hopper, and to apply an electrical signal indicative of the measured weight to a combination control unit, not shown. The combination control unit serves to divide the weight of the articles contained in each of the weighing hoppers by the unit weight of the article to determine the number of articles in each weighing hopper, and then serves to select an optimum combination of those weighing hoppers which contain a total number of articles that is equal to or closest to a set target number.

Each weighing hopper 1d is provided with its own weighing hopper gate 1f. Only the weighing hopper gates 1f of the weighing hoppers in the optimum combination are opened under the control of the hopper driver unit 1g to discharge the articles into a common chute 1j wherein they are collected together. The collecting chute 4 has the shape of a funnel and is so arranged as to receive the articles from any of the circularly arrayed weighing hoppers via the hopper gates, which are located above the funnel substantially along its outer rim. The articles received by the chute 1j are collected at the centrally located lower end thereof by falling under their own weight or by being forcibly shifted along the inclined wall of the funnel by a mechanical scraper or the like, which is not shown.

In operation, articles are charged into each of the pool hoppers 1b and weighing hoppers 1d. The weight sensors 1e associated with the weighing hoppers 1d measure the weights of the articles and supply the combination control unit, not shown, with signals indicative of the measured weight values, denoted $W_1$ through $W_{10}$. The combination control unit computes the numbers of articles contained respectively in the weighing hoppers based on the weight values $W_1$ through $W_{10}$ and selects an optimum combination of those weighing hoppers which contain a total number of articles that is closest to a set target number within a preset allowable range. The hopper driver units 1g respond by opening the prescribed weighing hopper gates 1f based on the optimum combination, whereby the articles giving said optimum combination are released into the collecting chute 1j from the corresponding weighing hoppers 1d. This will leave the selected weighing hoppers 1d empty. Subsequently, therefore, the pool hopper gates 1c corresponding to the empty weighing hoppers 1d are opened to introduce a fresh supply of articles from the respective pool hoppers 1b into said weighing hoppers 1b, leaving these pool hoppers 1b empty. Accordingly, the dispersing feeders 1a which correspond to the empty pool hoppers 1b are vibrated for a predetermined period of time to deliver a fresh supply of articles to these empty pool hoppers 1b. This restores the weighing apparatus to the initial state to permit resumption of the control operation for selecting the optimum weight combinations in the manner described. Thus, counting by the combinatorial counting apparatus may proceed in continuous fashion by repeating the foregoing steps.

Figure 3:
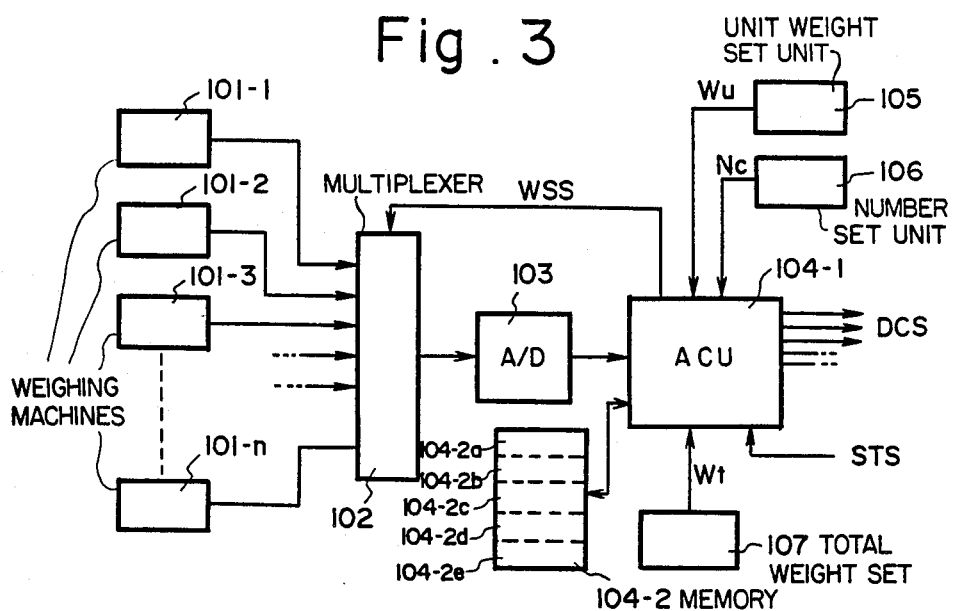

Reference will now be had to FIG. 3 to describe a first embodiment of the present invention. Designated at 101-1, 101-n are n-number of weighing machines, each comprising a weighing hopper and a weight sensor, for weighing articles introduced into the weighing hopper. Analog voltage signals produced by the weighing machines 101-1, . . . , 101-n and indicative of the weights measured thereby are applied to a multiplexer 102, composed of analog switches or the like, for successively delivering these analog weight voltages to an A/D converter 103 in response to a selection signal, described below. The A/D converter 103 converts the analog voltage signal selected by the multiplexer 102 into a digital weight signal for application to an arithmetic control unit 104-1 constituted by a microcomputer or the like. Numeral 104-2 denotes a memory associated with the arithmetic control unit 104-1. A unit weight setting device 105 is connected to the arithmetic control unit 104-1 for setting the unit weight $W_u$ of an article, as well as a number setting device 106 for setting the number $N_c$ of articles to be counted. Also connected to the arithmetic control unit 104-1 is a weight setting device 107 for setting the total weight $W_t$ of the number of articles set by the number setting device 106.

Figure 4:
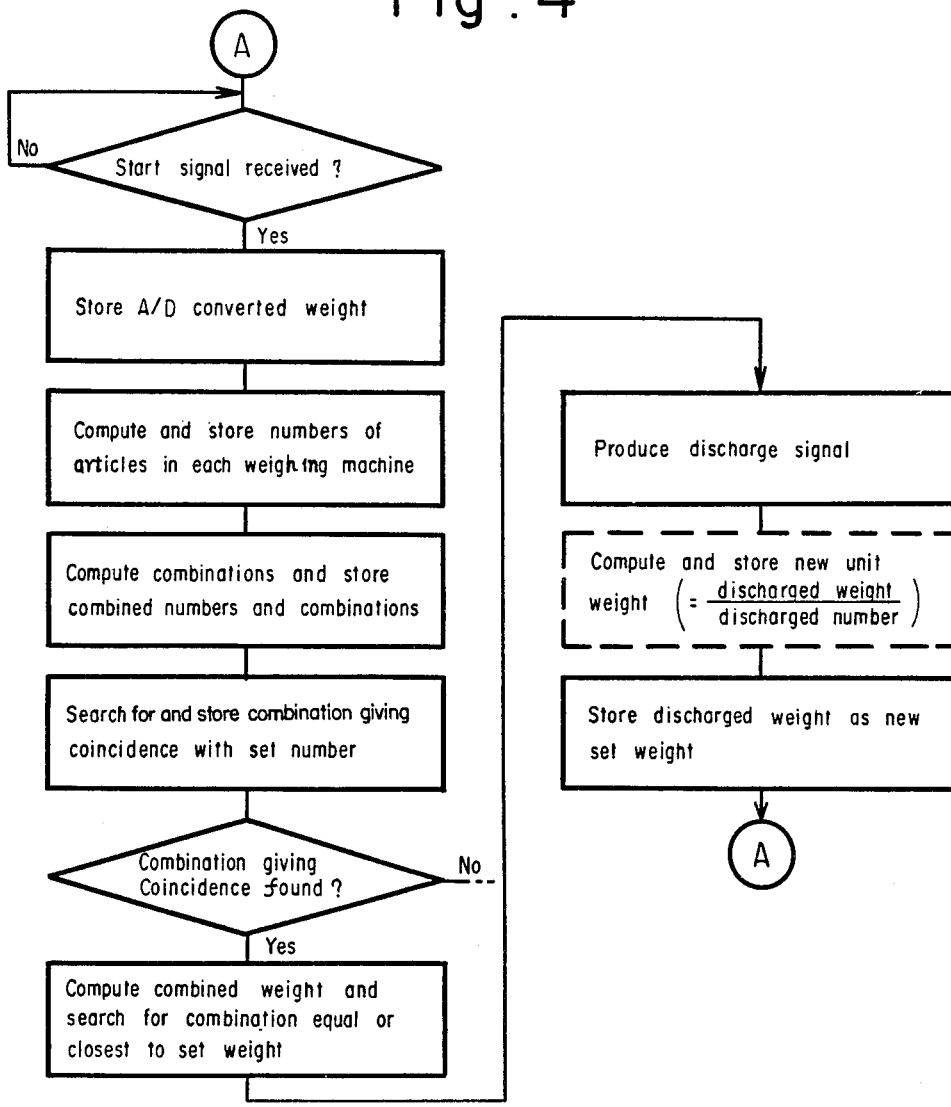

Operation of the arithmetic control unit 104-1 will be described with reference to the flowchart of FIG. 4.

It is assumed that a multiplicity of articles have been apportioned out and charged into the n-number of weighing machines 101-1, . . . , 101-n. When the arithmetic control unit 104-1 is supplied with a start signal STS from a packaging machine (not shown) for packaging counted articles, the arithmetic control unit 104-1 delivers a selection signal WSS to the multiplexer 102. The multiplexer 102 responds to the selection signal WSS by delivering analog weight voltages from the weighing machines 101-1, . . . , 101-n successively to the A/D converter 103, which proceeds to convert the input analog signals into digital weights for storage in a weight storage area 104-2a of memory 104-2. The arithmetic control unit 104-1 divides each weight value stored in the memory 104-2 by the unit weight Wu set by the unit weight setting device 105, and rounds off each quotient to the nearest whole number, thereby converting the weight of the articles contained in each of the weighing machines 101-1, . . . , 101-n into the number of articles contained in each weighing machine. The numbers of the articles are then stored in a number storage area 104-2b of the memory 104-2. Next, the arithmetic control unit 104-1 successively generates all possible combination codes, adds the previously stored article numbers that are now specified by the combination codes, thereby to determine combined numbers of the articles, and stores the combined numbers and the combination codes as pairs in a combination storage area 104-2c of the memory 104-2. The arithmetic control unit 104-1 then compares the number $N_c$ set by the setting device 106 with all of the combined numbers stored in the memory to retrieve the combination codes whose accompanying combined numbers coincide with the set number $N_c$. These combination codes are stored in a storage area 104-2d of the memory 104-2. When there is no combination that gives number coincidence, this is indicated by activating an alarm lamp or the like.

Next, the arithmetic control unit 104-1 computes combined weights by adding the weights of the articles in whichever of the weighing machines 101-1, ..., 101-n are specified by the combination codes that provide coincidence between the combined numbers and the set number $N_c$, finds the combination code of one of such combined weights which is equal or closest to the set weight as set by the weight setting device 107, and stores the found combination code and corresponding combined weight in a storage area 104-2e of the memory 104-2. This is the only pair stored in this storage area. The arithmetic control unit 104-1 then produces a discharge signal DCS which conforms to the combination code stored in the storage area 104-2e, whereupon the articles are released from the weighing machines corresponding to the discharge signal. These articles, the number of which will be equal to the set number $N_c$, are delivered to the packaging machine. The arithmetic control unit 104-1 now stores in memory the weight of the discharged articles, namely the combined weight equal or closest to the set weight. This stored weight serves as a new set weight. The storage of said weight ends the current counting cycle.

Thereafter, a fresh supply of the articles is charged into the weighing machines from which the articles have previously been discharged. When the start signal STS is again sent from the packaging machine to the arithmetic control unit 104-1, the weights of the articles contained in the weighing machines 101-1, ..., 101-n are stored in the manner described above, and are divided by the unit weight set by the unit weight setting device 105. The quotients are rounded off into data expressed in integers to thereby convert the weights of the articles in the weighing machines 101-1, ..., 101-n into number thereof which are stored in memory. As with the previous procedure, the arithmetic control unit 104-1 then retrieves the combination codes paired with the combined numbers, from among those computed based on the stored numbers, that coincide with the set number. This combination code is stored in memory. Now, from among the stored combinations, that which gives a combined weight equal or closest to the previously renewed set weight is retrieved to find the signal combination code corresponding thereto. The arithmetic control unit 104-1 issues the discharge signal DCS conforming to this combination code. The combined weight of the articles just discharged is now stored in memory as an renewed set weight to replace the set weight previously renewed and stored. Thenceforth the set weights are renewed in similar fashion for each combinatorial counting cycle.

Figure 1:
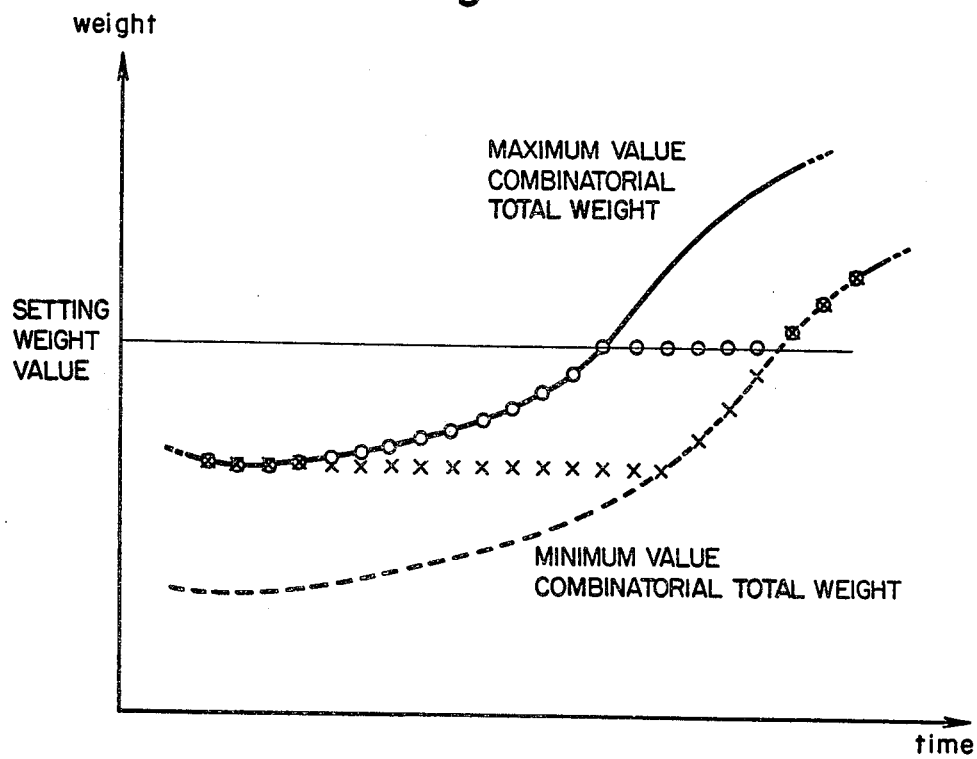
FIG. 1 is a graphical representation illustrating variations in the total weight of discharged articles according to the conventional combinatorial counting method and the combinatorial counting method of the present invention, respectively.

Thus, according to the method of the invention as described in the first embodiment thereof, the total weight of the articles discharged every combinatorial counting cycle is stored in memory as a renewed set weight and then, when the next combinatorial counting cycle is performed, articles are discharged from the weighing hoppers of those weighing machines corresponding to the combination whose combined weight is equal or closest to the set weight as previously renewed and stored, said combination being selected from among those paired with a combined number coincident with the set number. Such a counting method prolongs the period of time during which the total weight of the discharged articles is substantially constant. In a case where the unit weight of the articles delivered to the weighing machines increases with time, therefore, the total weight of the articles discharged from the weighing machines varies as shown by the marks of cross (X) in the graph of FIG. 1. It will be appreciated that the total weight of the discharged articles is substantially constant for a longer period of time.

Described next will be embodiments of the present invention wherein a set weight is renewed when predetermined conditions are satisfied.

Figure 5:
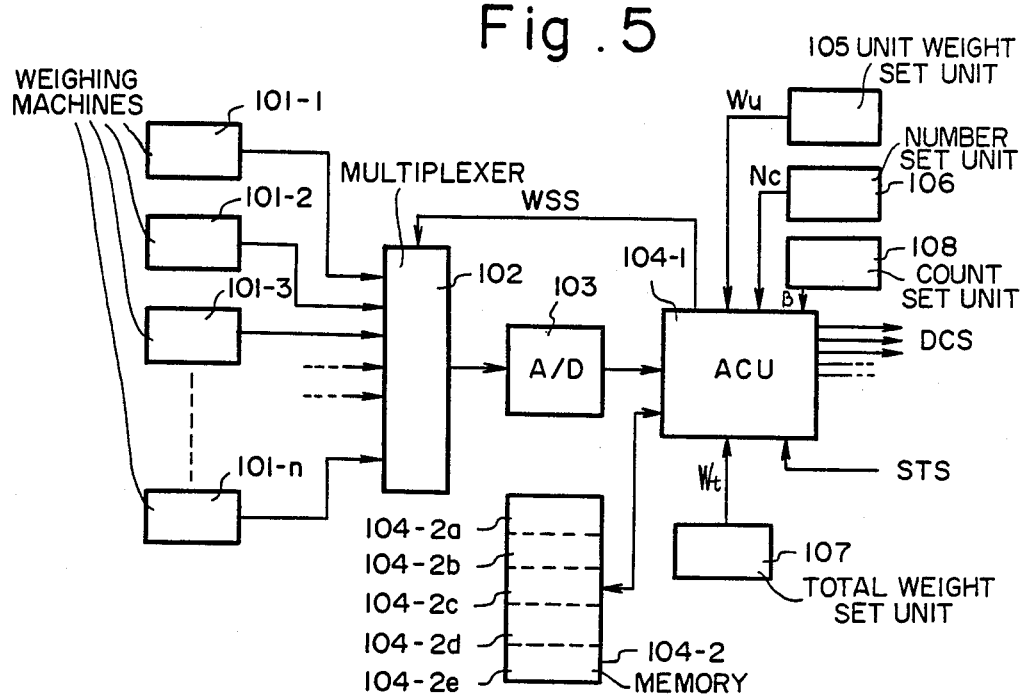
Figure 6:
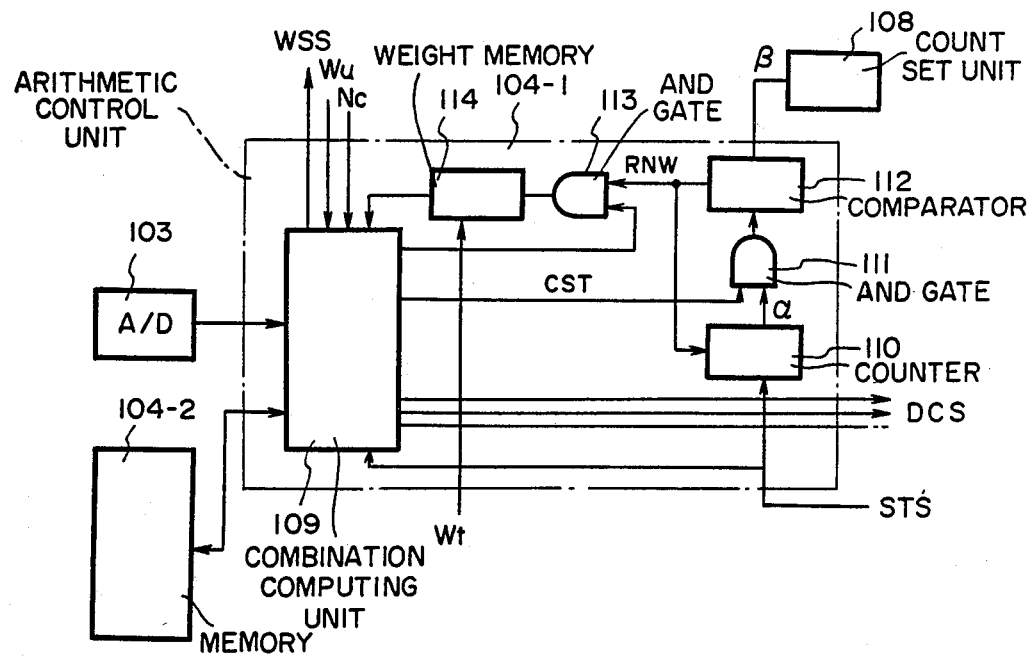
Figure 7:
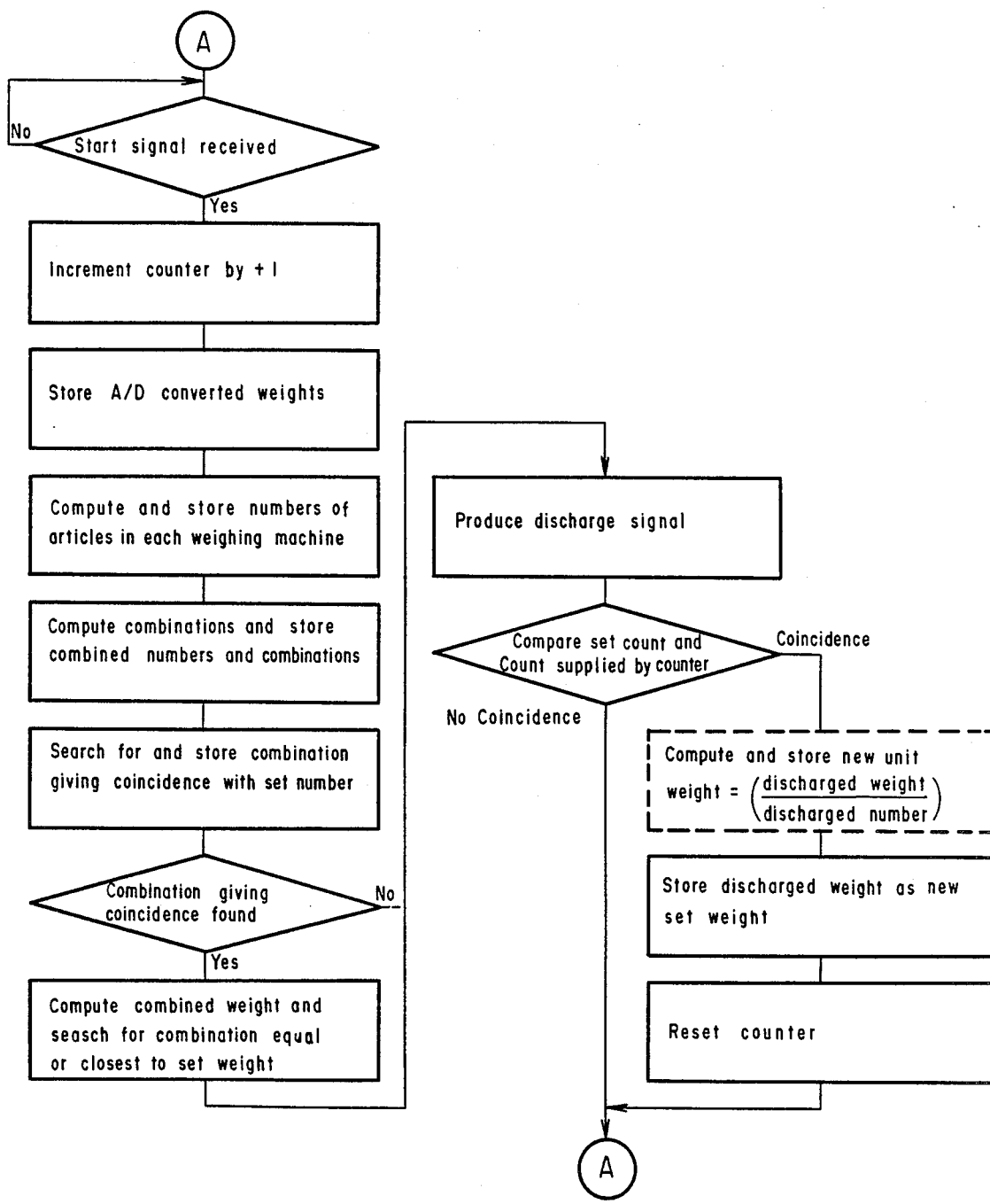

Reference will now be had to FIGS. 5, 6 and 7 to describe the second embodiment of the invention, wherein a set weight is renewed every predetermined number of counting cycles, or at predetermined time intervals. In FIGS. 5 and 6, portions corresponding to those shown in FIG. 3 are designated by like reference characters. FIG. 6 illustrates the details of the arithmetic control unit 104-1.

The embodiment shown in FIG. 5 is provided with a count setting device 108, connected to the arithmetic control unit 104-1, for determining how many times articles should be counted prior to updating a set weight. The arithmetic control unit 104-1 itself includes a combination computing circuit 109 for computing combinations based on weights supplied by the n-number of weighing machines 101-1, ..., 101-n through the multiplexer 102 and A/D converter 103. The inputs to the combination computing circuit 109 are such data as the unit weight $W_u$ stored in the unit weight setting device 105 and the set number $N_c$ stored in the number setting device 106. The arithmetic control unit 104-1 further includes a counter 110 whose status is counted up by one step each time the start signal STS is applied to the combination computing circuit 109, an AND gate 111 for delivering an output from the counter 110 when supplied with a comparison start command signal CST from the combination computing circuit 109, and a comparator 112 for comparing the count $\alpha$ supplied by the counter 110 and the count $\beta$ preset in the count setting device 108 and, when $\alpha$ and $\beta$ coincide, for producing a memory renewal signal RNW as an output which is applied to an AND gate 113 and to the counter 110 to reset the latter. The AND gate 113 serves to deliver the combined weight, computed by the combination computing circuit 109, to a weight memory 114 when the memory renewal signal RNW arrives from the comparator 112. The weight memory 114 stores the data $W_t$ set by the weight setting device 107 until the data arrives from the combination computing unit 109 via the AND gate 113.

The operation of the arithmetic control unit 104-1 having the above-described construction will be described with reference to the flowchart of FIG. 7.

It is assumed that a multiplicity of articles are apportioned out and charged into the n-number of weighing machines 101-1, ..., 101-n. When the arithmetic control unit 104-1 is supplied with a start signal STS from a packaging machine (not shown) for packaging counted articles, the counter 110 within the arithmetic control unit 104-1 is counted up by one, and the combination computing circuit 109 then delivers a selection signal WSS to the multiplexer 102. The multiplexer 102 responds to the selection signal WSS by delivering analog weight voltages from the weighing machines 101-1, ..., 101-n successively to the A/D converter 103, which proceeds to convert the input analog signals into digital weight signals for storage in the weight storage area 104-2a via the combination computing circuit 109. The latter divides each weight value stored in the memory 104-2 by the unit weight Wu set by the unit weight setting device 105, and rounds off each quotient to the nearest whole number, thereby converting the weight of the articles contained in each of the weighing machines 101-1, ..., 101-n into the number of articles contained in each weighing machine. The numbers of the articles are then stored in the number storage area 104-2b of the memory 104-2. Next, the combination computing circuit 109 successively generates all possible combination codes, adds the previously stored article numbers (the article numbers stored in memory 104-2) that are specified by the combination codes, thereby to determine combined numbers of the articles, and stores the combined numbers and the combination codes as pairs in the combination storage area 104-2c of the memory 104-2. The combination computing circuit 109 then compares the number $N_c$ set by the setting device 106 with all of the combined numbers stored in the memory to retrieve the combination codes whose accompanying combined numbers coincide with the set number $N_c$. These combination codes are stored in a storage area 104-2d of the memory 104-2. When there is no combination that gives number coincidence, this is indicated by activating an alarm lamp or the like.

Next, the combination computing circuit 109 computes combined weights by adding the weights of the articles in whichever of the weighing machines 101-1, ..., 101-n are specified by the combination codes that provide coincidence between the combined numbers and the set number $N_c$, finds the combination code of one of such combined weights which is equal or to closest to the set weight $W_t$ as set by the weight setting device 107, and stores the found combination code and corresponding combined weight as a pair in the storage area 104-2e of the memory 104-2. This is the only pair stored in this storage area. The combination computing circuit 109 then produces a discharge signal DCS which conforms to the combination code stored in the storage area 104-2e, whereupon the articles are released from the weighing machines corresponding to the discharge signal. These articles, the number of which will be equal to the set number $N_c$, are delivered to the packaging machine.

The combination computing circuit 109 now delivers the comparision start command signal CST to the AND gate 111, so that the number of start signals STS counted by the counter 110 is applied to the comparator 112. The comparator 112 now compares the count supplied by counter 110 with the count preset by the count setting device 108. If the number of counting operations counted by the counter 110 has not reached the count set by the count setting device 108, then the comparator 112 does not produce the memory renewal output signal RNW. Therefore, the weight data stored in the weight memory 114 is not renewed. This ends the current counting cycle.

Thereafter, a fresh supply of articles is charged into the weighing hoppers from which the articles have previously been discharged. When the start signal STS from the packaging machine again enters the arithmetic control unit 104-1, the status of counter 110 is incremented in the manner described above, the weights of the articles contained in the weighing machines 101-1, ..., 101-n are stored in the memory 104-2, these weights are divided by the unit weight $W_u$ stored in the unit weight setting device 105, the quotients are rounded off to the nearest whole number to convert the weights into the number of the articles contained in the weighing machines 101-1, ..., 101-n, and the number of the articles are stored in memory. As with the previous procedure, the next step is to retrieve the sole combination which has a combined number of articles equal to the set number $N_c$, the combined weight of which is equal or closest to the set weight Wt stored in the weight memory 114. The discharge signal DCS conforming to this combination is applied to the combination computing circuit 109. At the same time, the combination computing circuit 109 sends the comparison start command signal CST to the AND gate 111. If the number of counting operations as counted by the counter 110 still falls short of the count set by the count setting device 108, then the counting operation ends in the manner described above.

The foregoing cycle of operation is repeated until the count which the counter 110 applies to the comparator 112 coincides with the count set by the count setting device 108. When such coincidence is achieved, the comparator 112 produces the memory renewal signal RNW which is applied to the AND gate 113 and to the counter 110 at the same time to reset the same. The AND gate 113, in response to the signal RNW, supplies the weight memory 114 with data indicative of the total weight of the articles just discharged, thereby renewing or updating the set weight stored in the weight memory 114. Thenceforth the set weight is renewed in a signal manner each time a predetermined number of the counting operations is performed.

In the embodiment described above, the operating for renewing the set weight has been described as being carried out each time a predetermined number of counting cycles are performed. It should be noted, however, that the set weight renewal can be executed at a predetermined time interval as set by time or the like, or by providing a clock pulse generating circuit for supplying clock pulses to the counter 110 in place of the start signal STS.

A third embodiment of the invention will now be described with reference to FIGS. 8, 9 and 10, wherein a set weight is renewed when a combined weight falls within a preset range of values.

Figure 8:
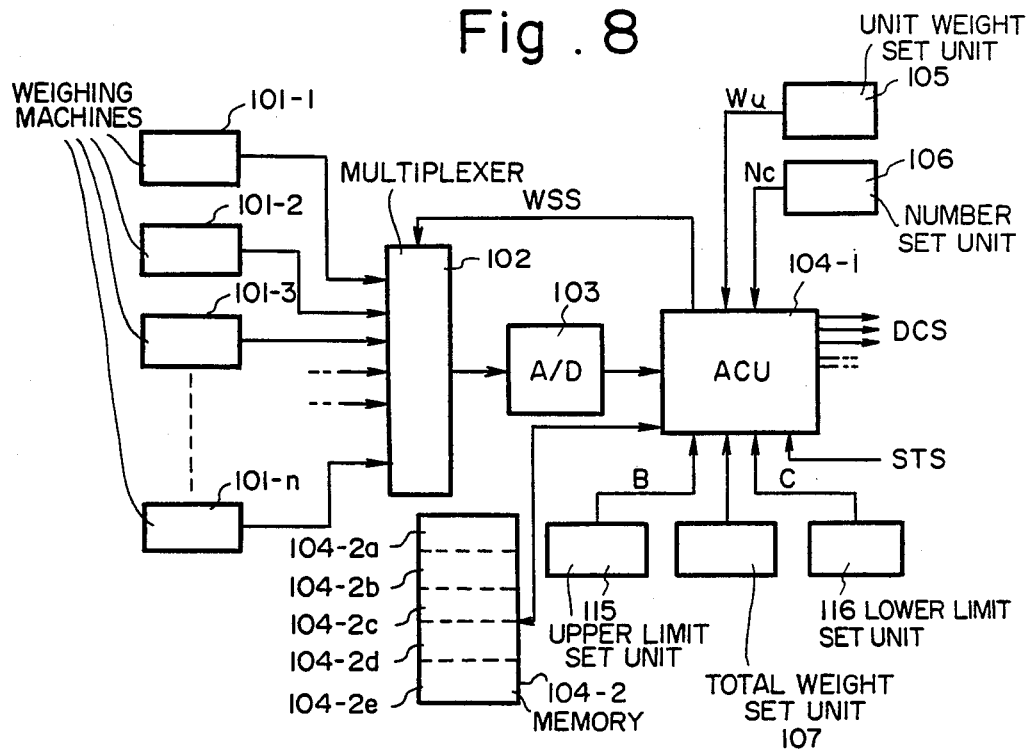
Figure 9:
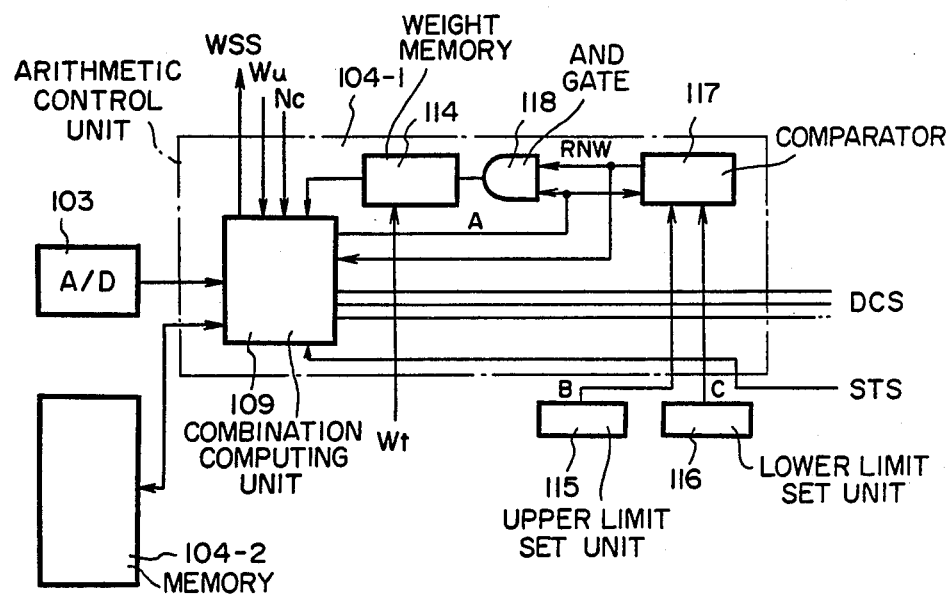
Figure 10:
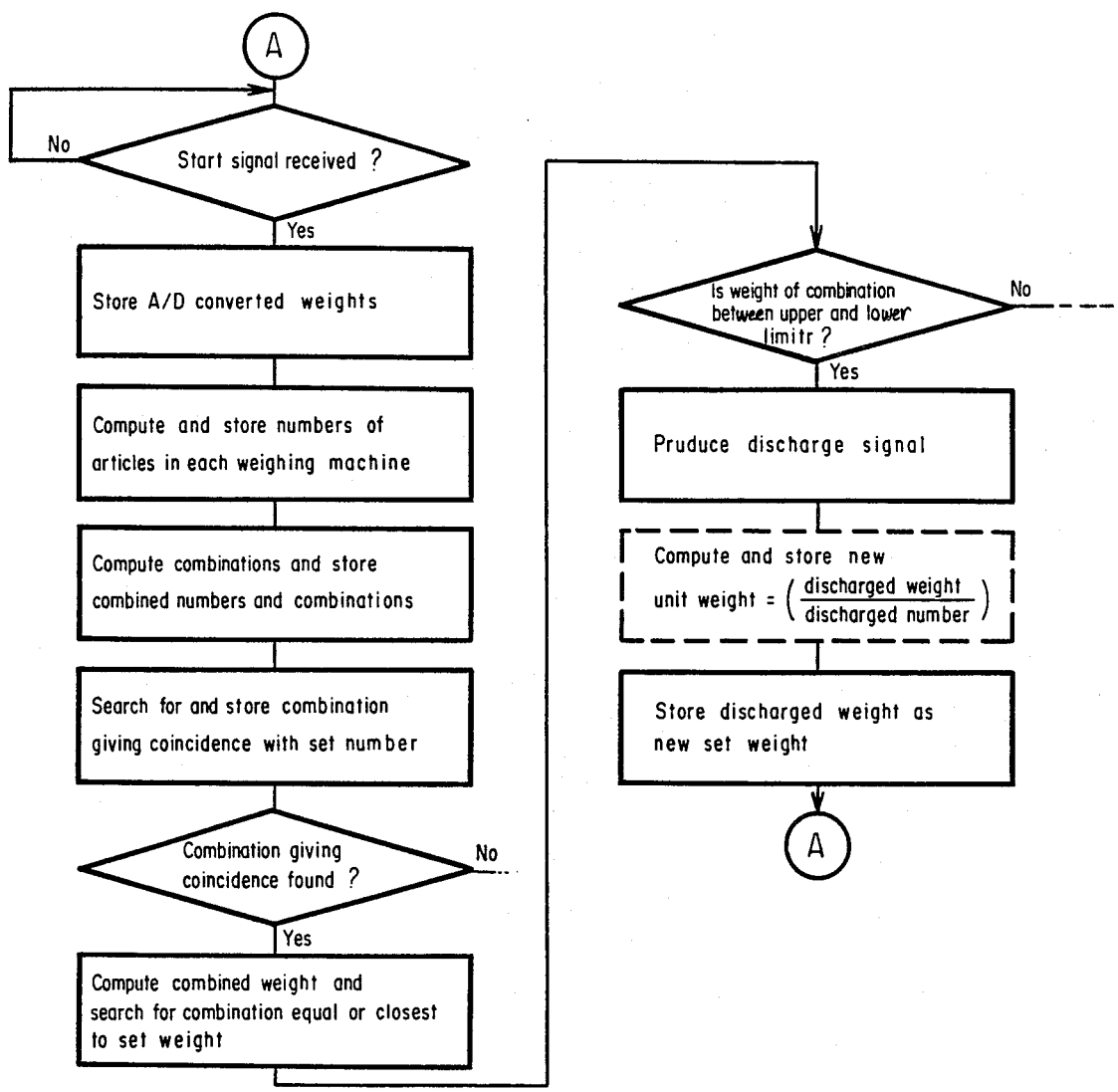

In this embodiment, as shown in FIGS. 8 and 9, there are provided an upper weight limit setting device 115 connected to the arithmetic control unit 104-1 for setting an upper weight limit B on the set weight, and a lower weight limit setting device 116 connected to the arithmetic control unit 104-1 for setting a lower weight limit C on the set weight.

The details of the arithmetic control unit 104-1 of FIG. 8 are illustrated in the block diagram of FIG. 9. The arithmetic control unit 104-1 includes a comparator 117 for comparing a total weight A, based on a combination computed by the combination computing circuit 109, with upper and lower limits B, C on a set weight $W_t$, the upper and lower limits B, C being set by the setting device 115, 116, respectively, and for delivering a memory renewal signal RNW to an AND gate 118 and to the combination computing circuit 109 when the combined weight A is less than the upper limit B and greater than the lower limit C, that is, when the inequality $B>A>C$ holds. The AND gate 118 serves to deliver the combined weight data A, computed by the combination computing circuit 109, to the weight memory 114 when the memory renewal signal RNW arrives the comparator 117. The weight memory 114 stores the weight data $W_t$ set by the weight setting device 107 until the end of the first counting cycle.

The operation of the arithmetic control unit 104-1 having the above-described construction will be described with reference to the flowchart of FIG. 10. As set forth above, the combination computing circuit 109 converts the input weights arriving from the weighing machines into the numbers of the articles contained in the weighing machines thereby to compute combinations, and retrieves the sole combination which has a combined number of articles equal to the set number $N_c$, the combined weight of which is equal to or closest to the set weight Wt stored in the weight memory 114. This combination code and accompanying combined weight A are stored, as a pair, in the memory 104-2. This is the only combination code and combined weight stored. The stored weight A is applied to the comparator 117 where it is compared with the set weight upper and lower limits B, C set by the upper and lower limit setting devices 115, 116, respectively. If the combined weight falls within the range defined by these limits, then the comparator 117 applies the memory renewal signal RNW to the combination computing circuit 109 and to the AND gate 118. The latter then provides the weight memory 114 with the above-mentioned stored combined weight A, found by the combination circuit 109, thereby renewing the set weight. The combination computing circuit 109 also delivers the discharge signal DCS conforming to the combination code of the stored combined weight, whereupon the articles are released from the weighing machines corresponding to the discharge signal. These articles, the number of which will be equal to the set number $N_c$, are delivered to the packaging machine, thereby ending the counting cycle.

Thereafter, a fresh supply of articles is charged into the weighing hoppers from which the articles have previously been discharged. When the start signal STS from the packaging machine enters the arithmetic control unit 104-1, the weights of the articles contained in the weighing machines 101-1, ..., 101-n are stored in the memory 104-2, these weights are divided by the unit weight $W_u$ stored in the unit weight setting device 105, the quotients are rounded off to the nearest whole number to convert the weights into the number of the articles contained in the weighing machines 101-1, ..., 101-n, and the number of the articles are stored in memory. As with the previous procedure, the next step is to retrieve the sole combination which has a combined number of articles equal to the set number $N_c$, and of which the combined weight is equal or closest to the renewed set weight stored in the weight memory 114. When the combined weight of this combination is within the upper and lower weight limits, the value indicative of this combined weight is delivered to the weight memory 114 to renew the set weight stored there. At the same time, the combination computing circuit 109 delivers the discharge signal DCS conforming to the combination code of the stored combined weight, whereupon the articles are released from the weighing machines corresponding to the discharge signal. These articles, the number of which will be equal to the set number $N_c$, are delivered to the packaging machine. Thereafter the set weight will be renewed in the manner described above so long as the combined weight found every counting cycle falls within the preset limits.

When the combined weight found by the combination computing circuit 109 and delivered to the comparator 117 does not fall within the upper and lower set weight limits set by the upper and lower limit setting circuits 115, 116, respectively, the comparator 117 does not send the memory renewal signal RNW to the AND gate 118 and combination computing circuit 109 and, hence, the set weight is not renewed. Moreover, the combination computing circuit 109 does not produce the discharge DCS, so that the counting operation is halted without articles being discharged from the weighing machines.

A fourth embodiment of the present invention will be described with reference to FIGS. 11, 12 and 13. With this embodiment, a set weight is renewed at every predetermined number of counting cycles, or at predetermined time intervals, if the combined weight falls within a preset range.

Figure 11:
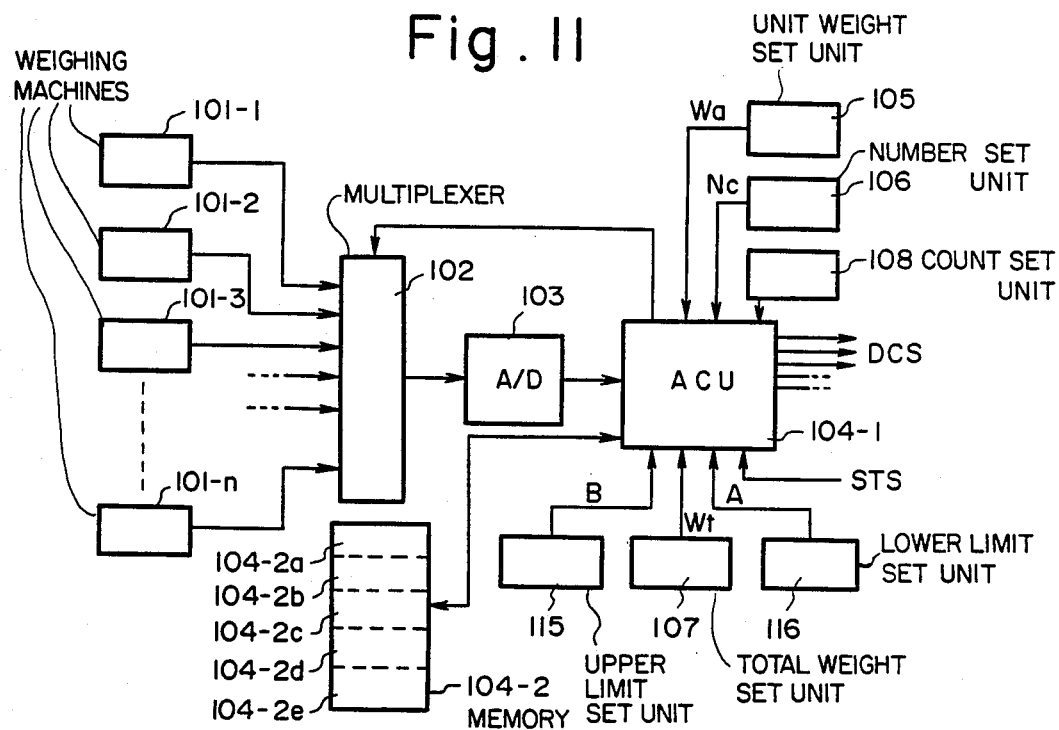
Figure 12:
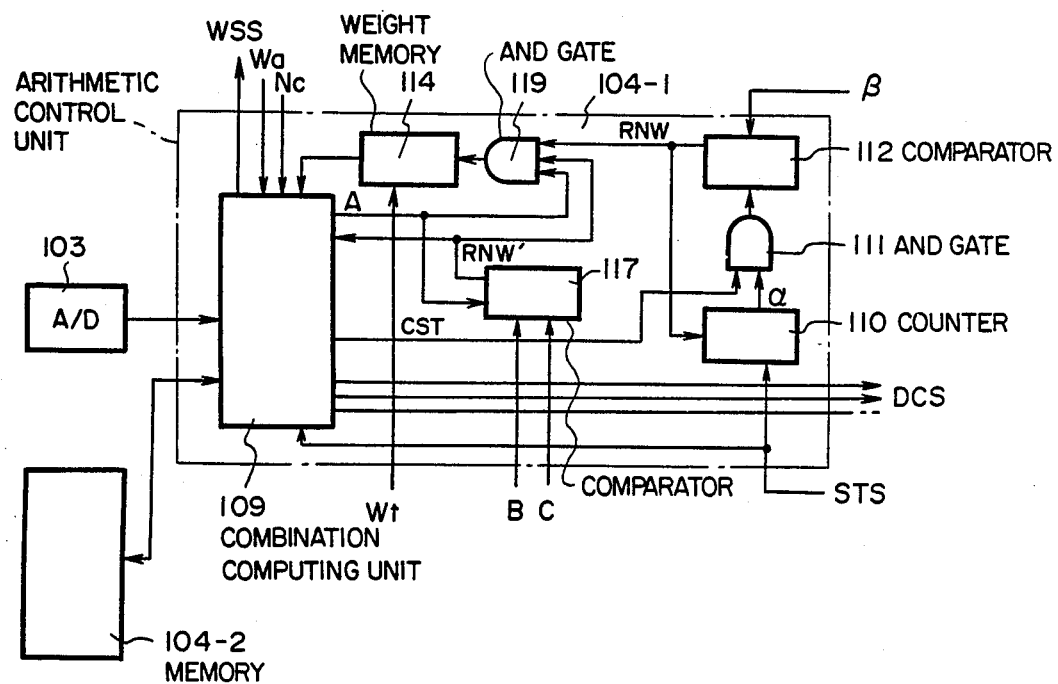
Figure 13:
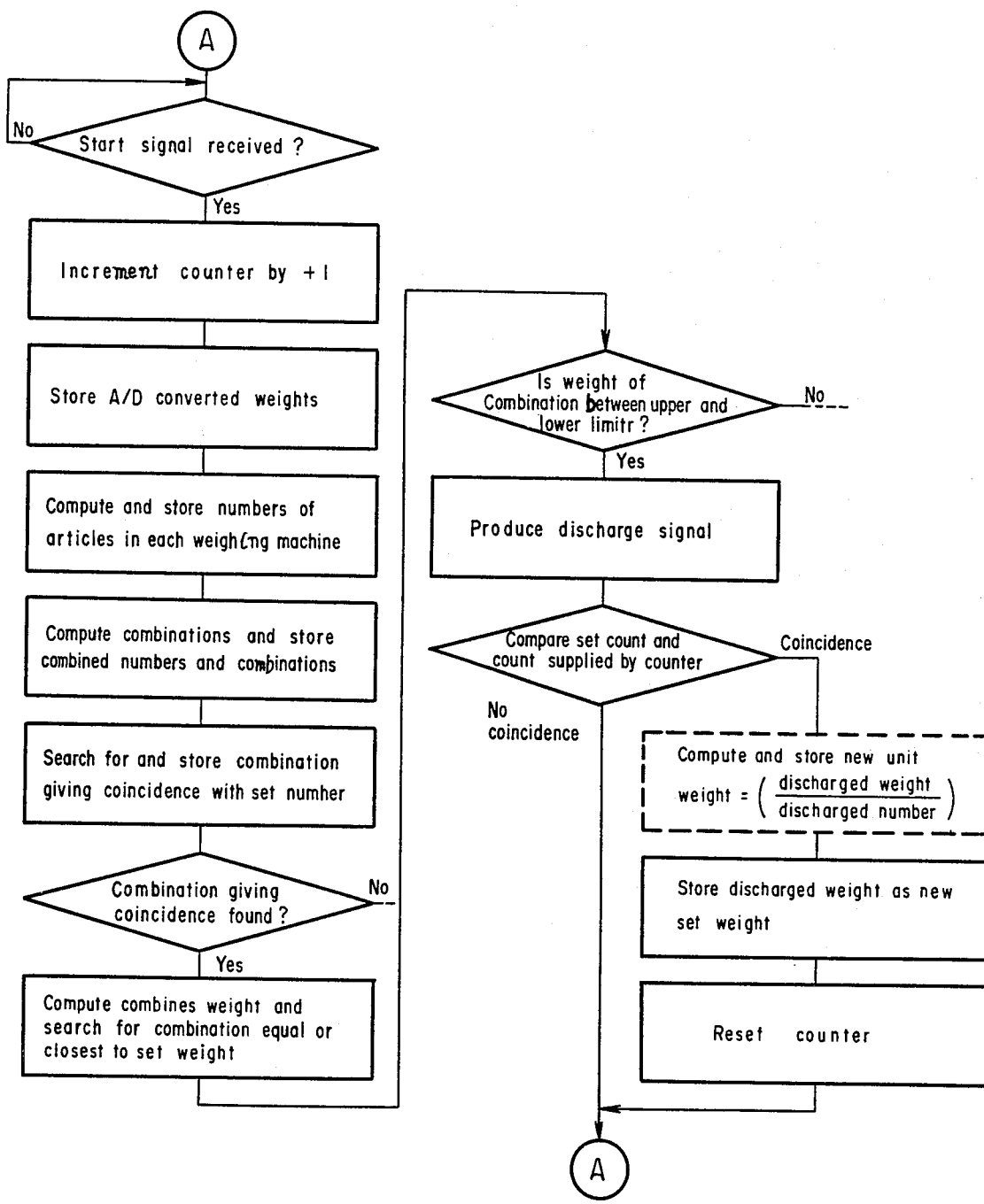

FIG. 11 is a block diagram illustrating the overall system, and FIG. 12 is a block diagram showing the details of the arithmetic control unit 104-1 in this embodiment. The arithmetic control unit 104-1 includes a three-input AND gate 119 for providing the weight memory 114 with the combined weight A, found by the combination computing circuit 109 and present at one input terminal to the AND gate, when a first memory renewal signal RNW from the comparator 112 and a second memory renewal signal RNW' from the comparator 117 are present at the other two inputs to the AND gate.

The operation of the arithmetic control unit 104-1 having the above-described construction will be described with reference to the flowchart of FIG. 13.

When the arithmetic control unit 104-1 is supplied with a start signal STS, the counter 110 within the arithmetic control unit 104-1 is counted up by one. As set forth above, the combination computing circuit 109 converts the input weights arriving from the weighing machines into the numbers of the articles contained in the weighing machines thereby to compute combinations, and retrieves the sole combination which has a combined number of articles equal to the set number $N_c$, the combined weight of which is equal to or closest to the set weight Wt stored in the weight memory 114. This combination code and accompanying combined weight A are stored, as a pair, in the memory 104-2. This is the only combination code and combined weight stored. The stored weight A is applied to the comparator 117 where it is compared with the set weight upper and lower limits B, C set by the upper and lower limit setting devices 115, 116, respectively. If the combined weight falls within the range defined by these limits, then the comparator 117 applies the second memory renewal signal RNW' to the combination computing circuit 109 and to the AND gate 119. Concurrently, the combination computing circuit 109 produces the discharge signal DCS conforming to the combination code of the stored combined weight, as well as the comparison start command signal CST which is applied to the AND gate 111. As a result, the articles are released from the weighing machines corresponding to the discharge signal. These articles, the number of which will be equal to the set number $N_c$, are delivered to the packaging machine. In addition, the AND gate 11 supplies the comparator 112 with the count indicative of the number of counting cycles that have been performed, as counted by the counter 110. The comparator 112 then proceeds to compare the count supplied by counter 110 with the count preset by the count setting device 108. If the number of counting operations counted by the counter 110 has not reached the count set by the count setting device 108, then the comparator 112 does not produce the first memory renewal output signal RNW. Therefore, the lack of coincidence between the first and second memory renewal signals RNW, RNW' from the respective comparators 112, 117 causes the AND gate 114 to block the delivery of the combined weight, found by the combination computing circuit 109, to the weight memory 114. Thus, the weight data stored in the weight memory 114 is not renewed. This ends the current counting cycle.

Thereafter, a fresh supply of articles is charged into the weighing hoppers from which the articles have previously been discharged. When the start signal STS from the packaging machine again enters the arithmetic control unit 104-1, the status of counter 110 is incremented in the manner described above, the weights of the articles contained in the weighing machines 101-1, . . . , 101-n are stored in the memory 104-2, these weights are divided by the unit weight $W_u$ stored in the unit weight setting device 105, the quotients are rounded off to the nearest whole number to convert the weights into the number of the articles contained in the weighing machines 101-1, . . . , 101-n, and the number of the articles are stored in memory. As with the previous procedure, the next step is to retrieve the sole combination which has a combined number of articles equal to the set number $N_c$, the combined weight of which is equal to or closest to the set weight Wt stored in the weight memory 114. When the combined weight of this combination falls within the upper and lower weight limits, the comparator 117 delivers the signal RNW' to the comparison computing circuit 109 and to the AND gate 119. The combination computing circuit 109 therefore produces the discharge signal DCS and the comparison start command signal CST, which is applied to the AND gate 11. Accordingly, as before, the comparator 112 compares the number of counting operations provided by the counter 110 with the count set by the count setting device 108. If the number of counting operations as counted by the counter 110 still falls short of the count set by the count setting device 108, then the counting operation ends in the manner described above.

When the combined weight found by the combination computing circuit 109 and delivered to the comparator 117 does not fall within preset limits, the comparator 117 does not produce the second memory renewal signal RNW'. As a result, the combination computing circuit 109 does not produce the discharge DCS, so that the counting operation is halted without articles being discharged from the weighing machines.

When the count which the counter 110 applies to the comparator 112 agrees with the count set by the count setting device 108 after the foregoing counting operation has been repeated a number of times, the combined weight delivered to the comparator 117 has fallen within the preset limits and the combination computing circuit 109 has produced the discharge signal DCS, the comparator 112 produces the first memory renewal signal RNW which is applied to the AND gate 119 and to the counter 110, which is reset thereby. Since coincidence between signal RNW and the second memory renewal signal RNW' from the comparator 117 is now established at AND gate 119, the latter permits the combined weight (discharged weight) found by the combination computing circuit 109 to enter the weight memory 114, thereby renewing the set weight stored there. Thereafter, and in similar fashion, the set weight is renewed every predetermined number of counting operations if the combined weight obtained from the combination computing circuit 109 is within the set limits. It should be noted that an arrangement is possible wherein the set weight may be renewed at predetermined intervals set by a timer or the like if the combined weight at such time falls within the set limits.

It is possible to adopt an arrangement wherein the combination control unit 104-1 divides the weight of the discharged articles by the number of discharged articles, namely by the set number, to compute a new unit weight, thereby allowing the unit weight to be renewed. With such an arrangement the set weight (total weight) would be renewed ether before or after the renewal of the unit weight.

In each of the foregoing embodiments, combinations are sought that give coincidence between the combined numbers of articles and the particular set number. However, it is also permissible to find the combination that gives combined numbers equal or closest to the set number, with the proviso that the revision of the set weight in such case is carried out with the weight of the articles discharged at such time serving as the new set weight only when the combination of combined numbers that is found is equal to the set number. This will prevent the set weight from varying too widely. Moreover, in the mentioned case where the combination sought is equal to or closest to the set number, there will necessarily be instances where the articles discharged correspond to a combination of combined numbers closest to the set number because a combination of combined numbers equal to the set number cannot be found. When such is the case, the unit weight, found by dividing the weight of the discharged articles by the number of discharged articles, may be multiplied by a predetermined set number to provide a value which may then be stored as a new set weight. When a combination of combined numbers equal to the set weight is found, however, the weight of the articles discharged at such time is stored as the new set weight.

While in the previous embodiments the n numbers of articles are determined by converting the n weights measured by the n weighing machines, a single weighing machine may be used to weigh a plurality of batches of articles in a single combinatorial weighing operation. With such an arrangement, the n weights may be determined by using a single weighing machine or a plurality of weighing machines, and the n numbers may be found by converting the determined weights into numbers.

According to the present invention as described and illustrated above, a method is provided for weighing a multiplicity of articles by one or a plurality of weighing machines, dividing the resulting plurality of weights by a unit weight to convert the weights into respective numbers, finding combinations of these numbers to compute combined numbers, finding the single combination of which the combined numbers are equal to or closest to a set number and of which the combined weight is equal or closest to a set weight, and renewing the set weight every counting operation or whenever predetermined conditions are satisfied to use said set weight when the next counting operation is performed. Therefore, when counting articles the unit weight whereof varies gradually with time, the method of the invention makes it possible to prolong the period of time during which the total weight of discharged articles is substantially constant. Packaged articles having more uniform contents and weight from one package to another can thus be obtained. If a predetermined condition mentioned above is a predetermined number of counting operations or a predetermined length of time, moreover, then needless renewal steps can be eliminated, as when there is almost no change in a set weight despite a renewal performed every counting operation. Furthermore, if a predetermined condition is that a combined weight should fall within a preset range, then it becomes possible to prevent a situation where a combined weight, which for some reason exhibits an abnormally large weight variation, is stored in memory as a new set weight. In other words, this prevents a large fluctuation in the set weight, assuring that only packaged articles of a net weight within the set range will be obtained.

As many apparently widely different embodiments of the present invention can be made without departing from the spirit and scope thereof, it is to be understood that the invention is not limited to the specific embodiments thereof except as defined in the appended claims.

What we claim is:

1. A combinatorial counting method for weighing a multiplicity of articles by one or a plurality of weighing machines, dividing the resulting plurality of weights by a unit weight to convert the weights into respective numbers of the articles, finding combinations of these numbers to compute combined numbers, and finding optimum combinations of which the combined numbers are equal or closest to a set number and of which the combined weights are equal or closest to a set weight, said method comprising the steps of discriminating whether the combined number of an optimum combination is equal to the set number and, when equality is discriminated, employing the combined weight of said optimum combination as the set weight in the next combinatorial counting operation.

2. A combinatorial counting method according to claim 1, further comprising the steps of counting the number of times combinatorial counting operations are performed and, when said number of times attains a preset number of times $N_c$, employing the combined weight of the optimum combination obtained in the $N_c$-th combinatorial counting operation as a set weight in the next combinatorial counting operation.

3. A combinatorial counting method according to claim 1, further comprising the steps of measuring the duration of combinatorial counting operations and, when the duration exceeds a preset duration, employing the combined weight of the optimum combination which prevails at that time as a set weight.

4. A combinatorial counting method according to claim 1, in which a unit weight obtained by dividing the combined weight of said optimum combination number thereof is employed as the unit weight in the next combinatorial counting operation.

5. A combinatorial counting method for weighing a multiplicity of articles by one or a plurality of weighing machines, dividing the resulting plurality of weights by a unit weight to convert the weights into respective numbers of the articles, finding combinations of these numbers to compute combined numbers, and finding optimum combinations of which the combined numbers are equal or closest to a set number and of which the combined weights are equal or closest to a set weight, said method comprising the steps of:
   discriminating whether the combined number of an optimum combination is equal to the set number;
   discriminating whether the combined weight of said optimum combination lies within a preset range; and
   when the combined number is equal to the set number and the combined weight lies within the preset range, employing the combined weight of said optimum combination as a set weight in the next combinatorial counting operation.

6. A combinatorial counting method according to claim 5, further comprising the steps of counting the number of times combinatorial counting operations are performed and, when said number of times exceeds a preset number of times $N_c$, employing the combined weight of the optimum combination which prevails at that time as a set weight in the next combinatorial counting operation.

7. A combinatorial counting method according to claim 5, further comprising the steps of measuring the duration of combinatorial counting operations and, when the duration exceeds a preset duration, employing the combined weight of the optimum combination which prevails at that time as a set weight.

8. A combinatorial counting method according to claim 5, in which a unit weight obtained by dividing the combined weight of said optimum combination by the combined number thereof is employed as the unit weight in the next combinatorial counting operation.

9. A combinatorial counting method for weighing a multiplicity of articles by one or a plurality of weighing machines, dividing the resulting plurality of weights by a unit weight to convert the weights into respective numbers of the articles, finding combinations of these numbers to compute combined numbers, and finding optimum combinations of which the combined numbers are equal or closest to a set number and of which the combined weights are equal or closest to a set weight, said method comprising the steps of:
   discriminating whether the combined number of an optimum combination is equal to the set number;
   dividing the combined weight of the optimum combination by the combined number thereof when equality is not discriminated; and
   employing a value, obtained by multiplying the quotient obtained from said dividing step by the set number, as a set weight in the next combinatorial counting operation.

10. A combinatorial counting method for weighing a multiplicity of articles by one or a plurality of weighing machines, dividing the resulting plurality of weights by a unit weight to convert the weights into respective numbers of the articles, finding combinations of these numbers to compute combined numbers, and finding optimum combinations of which the combined numbers are equal or closest to a set number and of which the combined weights are equal or closest to a set weight, said method comprising the steps of:

discriminating whether the combined number of an optimum combination is equal to the set number;

discriminating whether the combined weight of said optimum combination lies with a preset range;

when the combined number is not equal to the set number and the combined weight lies within the preset range, dividing the combined weight of the optimum combination by the combined number thereof; and employing a value, obtained by multiplying the quotient by the set number, as a set weight in the next combinatorial counting operation.

* * * * *

UNITED STATES PATENT AND TRADEMARK OFFICE
CERTIFICATE OF CORRECTION

PATENT NO. : 4,466,499
DATED : AUGUST 21, 1984
INVENTOR(S) : KAZUKIYO MINAMIDA ET AL.

It is certified that error appears in the above-identified patent and that said Letters Patent is hereby corrected as shown below:

Col. 1, line 28, "hereafter" should be --hereinafter)--.

Col. 3, line 8, "providing" should be --provided--; and delete "conven-";
line 9, delete "vance" and insert --conveyance--;
line 17, "1," should be --le,--;
line 51, "4" should be --lj--.

Col. 4, line 13, "lb" (second occurrence) should be --ld--.

Col. 5, line 54, "number" should be --numbers--.

Col. 7, line 50, "or to" should --to or--.

Col. 8, line 49, "operating" should be --operation--.

Col. 9, line 16, after "arrives" insert --from--.

Col. 11, line 11, "11" should be --111--;
line 54, "11" should be --111--.

Signed and Sealed this

Twelfth Day of March 1985

[SEAL]

Attest:

DONALD J. QUIGG

Attesting Officer    Acting Commissioner of Patents and Trademarks